United States Patent
Tian et al.

(10) Patent No.: US 11,645,547 B2
(45) Date of Patent: May 9, 2023

(54) HUMAN-MACHINE INTERACTIVE METHOD AND DEVICE BASED ON ARTIFICIAL INTELLIGENCE

(71) Applicant: BEIJING BAIDU NETCOM SCIENCE AND TECHNOLOGY CO., LTD., Beijing (CN)

(72) Inventors: Hao Tian, Beijing (CN); Shiqi Zhao, Beijing (CN); Zhou Xin, Beijing (CN); Quan Wen, Beijing (CN); Wentao Ma, Beijing (CN); Teng Xu, Beijing (CN); Xinnuo Xu, Beijing (CN); Haisong Zhang, Beijing (CN); Xiangyang Zhou, Beijing (CN); Rui Yan, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1100 days.

(21) Appl. No.: 16/317,526

(22) PCT Filed: Jan. 23, 2017

(86) PCT No.: PCT/CN2017/072267
§ 371 (c)(1),
(2) Date: Jan. 11, 2019

(87) PCT Pub. No.: WO2018/040501
PCT Pub. Date: Mar. 8, 2018

(65) Prior Publication Data
US 2019/0286996 A1   Sep. 19, 2019

(30) Foreign Application Priority Data

Sep. 5, 2016   (CN) .......................... 201610803645.8

(51) Int. Cl.
*G06N 5/02*       (2023.01)
*G06F 16/9032*   (2019.01)
(Continued)

(52) U.S. Cl.
CPC ............... *G06N 5/02* (2013.01); *G06F 16/00* (2019.01); *G06F 16/90332* (2019.01); *G06F 40/40* (2020.01)

(58) Field of Classification Search
CPC ..... G06F 16/90332; G06F 16/00; G06F 40/40
See application file for complete search history.

(56) References Cited

U.S. PATENT DOCUMENTS

2009/0070311 A1   3/2009  Feng
2013/0185081 A1*  7/2013  Cheyer ..................... G06F 9/54
                                                          704/275

FOREIGN PATENT DOCUMENTS

CN   104615646 A   5/2015
CN   105068661 A   11/2015
(Continued)

OTHER PUBLICATIONS

Chinese Patent Application No. 201610803645.8 Second Office Action dated May 23, 2019, 6 pages.
(Continued)

*Primary Examiner* — Sherrod L Keaton
(74) *Attorney, Agent, or Firm* — Cozen O'Connor

(57) ABSTRACT

The present disclosure provides a human-machine interactive method based on artificial intelligence and a human-machine interactive device based on artificial intelligence. The method includes: receiving a query from a user; processing the query based on a pre-generated model, and obtaining an answer with a human conversation style cor-
(Continued)

responding to the query, wherein the model is generated based on a human conversation corpus; and feeding back the answer to the user.

15 Claims, 5 Drawing Sheets

(51) Int. Cl.
    *G06F 16/00*     (2019.01)
    *G06F 40/40*     (2020.01)

(56) References Cited

FOREIGN PATENT DOCUMENTS

| | | |
|---|---|---|
| CN | 105095444 A | 11/2015 |
| KR | 20150034785 A | 4/2015 |
| KR | 20150045177 A | 4/2015 |

OTHER PUBLICATIONS

Chinese Patent Application No. 201610803645.8 English translation of Second Office Action dated May 23, 2019, 6 pages.
Korean Patent Application No. 10-2019-7004771 Office Action dated Apr. 21, 2020, 8 pages.
Korean Patent Application No. 10-2019-7004771 English translation of Office Action dated Apr. 21, 2020, 6 pages.
European Patent Application No. 17844812.2 extended Search and Opinion dated Jan. 10, 2020, 9 pages.
Japanese Patent Application No. 2019-501993 Office Action dated Jan. 21, 2020, 5 pages.
Japanese Patent Application No. 2019-501993 English translation of Office Action dated Jan. 21, 2020, 4 pages.
Chinese Patent Application No. 201610803645.8 English translation of Office Action dated Jan. 11, 2019, 11 pages.
Chinese Patent Application No. 201610803645.8 Office Action dated Jan. 11, 2019, 9 pages.
PCT/CN2017/072267 English translation of International Search Report, dated May 31, 2017, 2 pages.

\* cited by examiner

HUMAN-MACHINE INTERACTIVE METHOD AND DEVICE BASED ON ARTIFICIAL INTELLIGENCE

CROSS-REFERENCE TO RELATED APPLICATION

This application is the US national phase application of International Application No. PCT/CN2017/072267, which claims priority to Chinese Patent Application No. 201610803645.8, filed with State Intellectual Property Office on Sep. 5, 2016, entitled "MAN-MACHINE INTERACTION METHOD AND APPARATUS BASED ON ARTIFICIAL INTELLIGENCE", filed by BEIJING BAIDU NETCOM SCIENCE AND TECHNOLOGY CO., LTD.

FIELD

The present disclosure relates to the field of artificial intelligence, and more particularly to a human-machine interactive method based on artificial intelligence, and a human-machine interactive device based on artificial intelligence.

BACKGROUND

Artificial intelligence ("AI") is a new technical science studying and developing theories, methods, techniques and application systems for simulating, extending and expanding human intelligence. Artificial intelligence is a branch of computer science, which attempts to know the essence of intelligence and to produce a new intelligent machine capable of acting in a same way as human intelligence. The researches in this field include intelligent meal ordering robots, speech recognition, image recognition, natural language processing and expert systems, etc.

With the development of technologies such as artificial intelligence, human-machine interaction systems have appeared in people's lives in various forms. For example, in the field of natural conversation, the machine can talk to people, and in the field of intelligent customer service, the customer service system can provide service for people. However, at present, the process of human-machine interaction system is usually that, after the machine receives a query from the user, the machine searches for a relevant answer in a database and presents it to the user. This manner is essentially retrieval, does not have the logic of conversation between humans, and cannot truly achieve the effect of conversation interaction between humans.

SUMMARY

The human-machine interactive method based on artificial intelligence includes: receiving a query from a user; processing the query based on a pre-generated model, and obtaining an answer with a human conversation style corresponding to the query, in which the model is generated based on a human conversation corpus; and feeding back the answer to the user.

Embodiments of the present disclosure provide a device. The device includes a processor and a memory configured to store instructions executable by the processor. The processor is configured to perform the method according to embodiments of the first aspect of the present disclosure.

Embodiments of the present disclosure provide a non-transitory computer-readable storage medium. When instructions stored in the storage medium are executed by a processor, the processor is configured to perform the method according to embodiments of the first aspect of the present disclosure.

Embodiments of the present disclosure provide a computer program product. When instructions stored in the computer program product are executed by a processor, the processor is configured to perform the method according to embodiments of the first aspect of the present disclosure.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
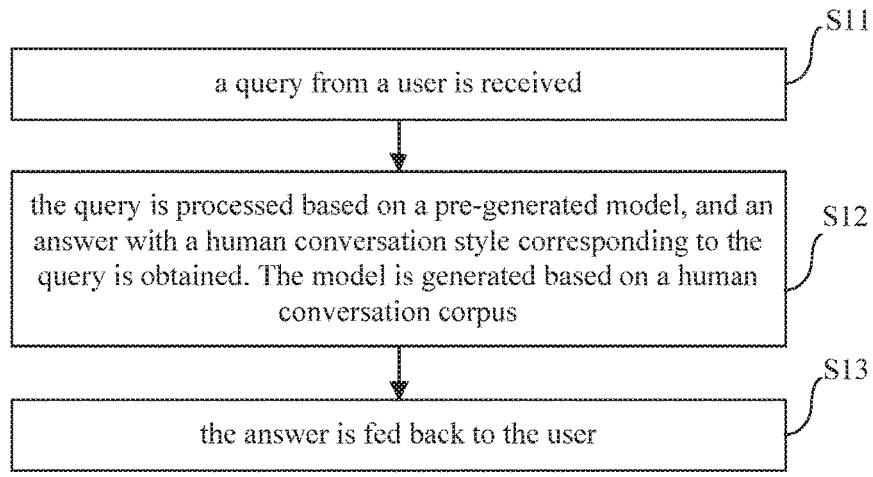
FIG. 1 is a flow chart of a human-machine interactive method based on artificial intelligence according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure. Instead, the embodiments of the present disclosure include all the variants, modifications and their equivalents within the spirit and scope of the present disclosure as defined by the appended claims.

FIG. 1 is a flow chart of a human-machine interactive method based on artificial intelligence according to an embodiment of the present disclosure As illustrated in FIG. 1, the embodiment may include followings.

At block S11, a query from a user is received.

The user can input the query in text, voice or picture form. When the query is not in the text form, the query in the non-text form can be converted to the text first. The specific adopted technology may include conversion technologies such as speech recognition, picture content recognition, or the like, and the conversion technology may be implemented by known technology or technology appeared in the future, which will not be described in detail herein.

At block S12, the query is processed based on a pre-generated model, and an answer with a human conversation style corresponding to the query is obtained. The model is generated based on a human conversation corpus.

The above model can be generated in a training phase. In the training phase, a large amount of human conversation corpus is collected first. The human conversation corpus is in units of a pair, and each pair includes a query and an answer. During training, the query in the corpus is taken as input to train the model, such that the output can be as consistent as possible with the corresponding answer in the corpus. Since the model is generated based on the human conversation corpus, thus after the current query is processed based on the model, the obtained output may also be the answer with the human conversation style.

Furthermore, the above model in specific implementations may not be limited to one, and may also be more, which respectively performs different functions, so as to obtain the answer with the human conversation style according to the query from the user.

At block S13, the answer is fed back to the user.

After the answer is obtained, the answer can be played to the user in the voice form.

In addition, when the answer obtained is in the text form, it can be converted into voice by technology such as voice synthesis.

In the embodiment, the answer corresponding to the query from the user is obtained based on the pre-generated model, the model is generated based on the human conversation corpus, and the answer has the human conversation style. Therefore, the machine can interact with humans in the human conversation style, making the human-machine interaction have the effect of real human-to-human conversation interaction.

The previous embodiment describes the conversation process, the model will be used in the conversation process, and the model may be generated in the training process. In the following, the process of generating the model in the training process will be described.

Figure 2:
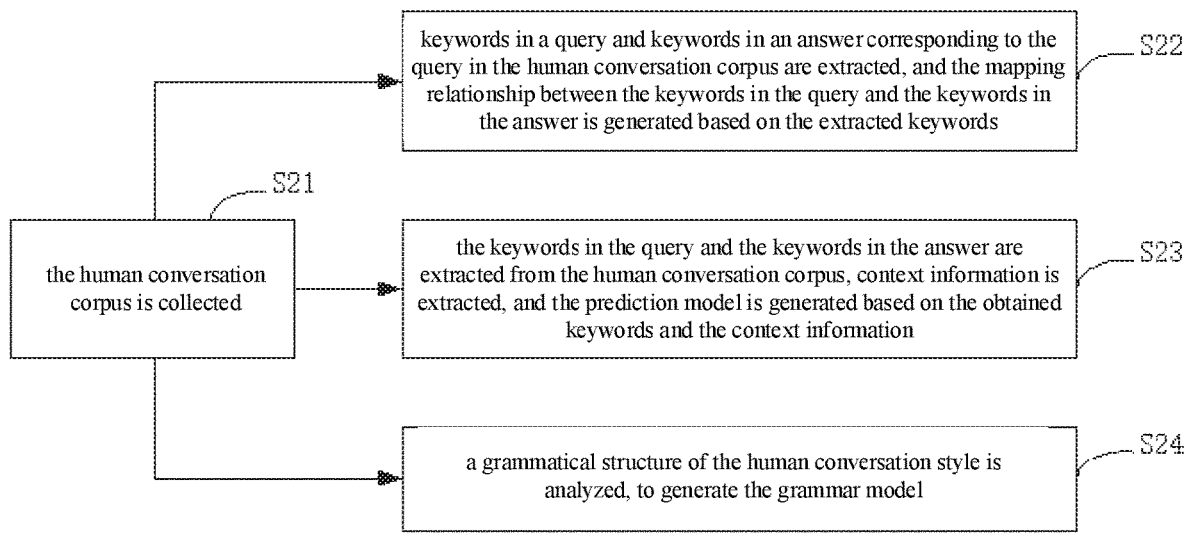
FIG. 2 is a flow chart of generating a model in a training process according to an embodiment of the present disclosure.

FIG. 2 is a flow chart of generating a model in a training process according to an embodiment of the present disclosure.

In the embodiment, the model includes a mapping relationship, a prediction model and a grammar model. The mapping relationship is configured to indicate a mapping relationship between keywords in the query and keywords in the answer. The prediction model is configured to determine an optimal mapping relationship from a plurality of mapping relationships based on context information, and generate collocation words matching the keywords in the determined mapping relationship. The grammar model is configured to adjust an order of terms, and generate a sentence conforming to a grammatical structure based on the adjusted terms.

As illustrated in FIG. 2, the embodiment may include followings.

At block S21, the human conversation corpus is collected.

The selection of the corpus may be based on all places with human conversations, including conversations in videos (movies, TV plays, animations, etc.), conversations in literary works (historical classics, mystery novels, romantic novels, online novels, etc.), conversations in social platforms (micro-blog, post bars, douban, etc.), conversations in local languages (northeastern dialect, Beijing dialect, Cantonese, etc.).

Figure 3:
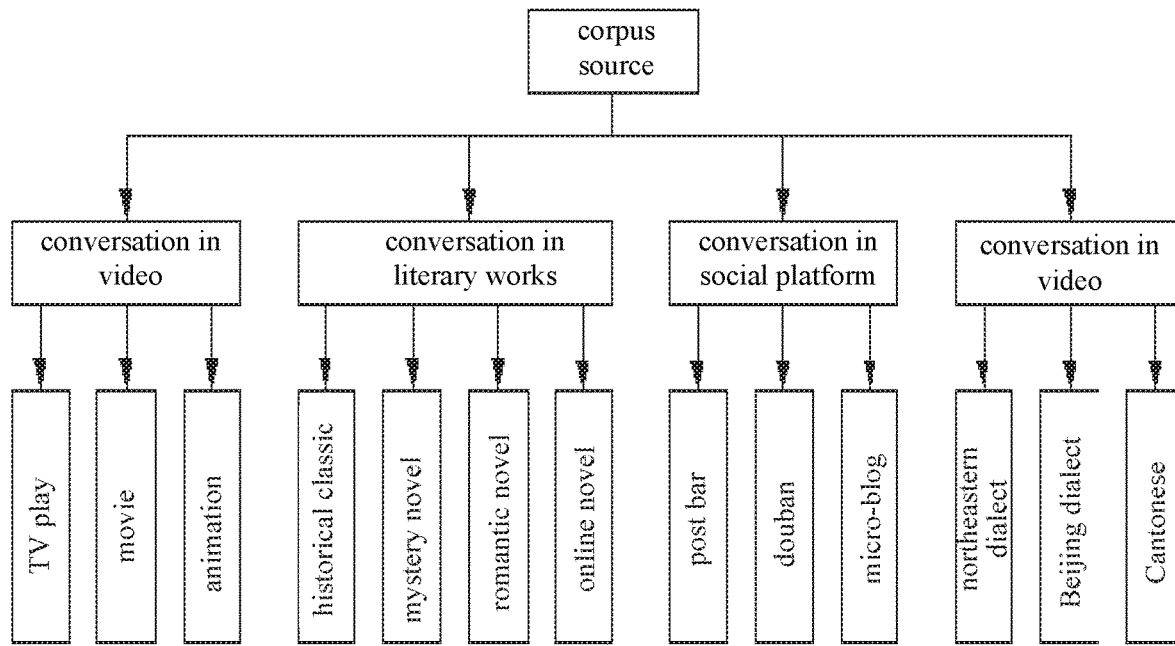
FIG. 3 is a schematic diagram of classification of a corpus source according to an embodiment of the present disclosure.

As illustrated in FIG. 3, a classification of corpus sources is provided, thus the corpus with different styles can be collected from the plurality of corpus sources, and the same corpus source may have one or more conversation styles. The conversation styles in conversations in videos may vary greatly depending on the type of the videos, the conversations in comedies may generally be humorous, the conversations in romantic videos may generally be affectionate, and the conversations in war videos may generally be intense. The conversation styles in literary works may also vary depending on the types, the conversations in historical classics may generally have characteristics of certain historical background, the conversations in mystery novels may have strict logic, and the conversations in romantic novels may have rich emotions. The conversations in online social platforms may have many network words, since they are daily conversations of humans, the overall style is closest to the human's daily conversation. Local language conversations include various local dialects, with various local characteristics.

At block S22, keywords in a query and keywords in an answer corresponding to the query in the human conversation corpus are extracted, and the mapping relationship between the keywords in the query and the keywords in the answer is generated based on the extracted keywords.

Corresponding to a set of human conversation corpus, word segmentation can be performed on the query (Q for short) and the answer (A for short), to obtain terms in the query and terms in the answer, and keywords can be determined in the terms (such as based on a probability of occurrence), and then the mapping relationship can be obtained by learning a large amount of corpus.

For example, a set of queries and answers may be as follows.

Q: I was busy for a day, and finally got off work.

A: You must be tired, go home now?

By respectively performing word segmentation on the query and the answer, and extracting the keywords therein, the keywords in the query can be obtained, including busy and get off work, and the keywords in the answer can include tired and go home. Therefore, a mapping relationship between "busy" and "tired" and a mapping relationship between "get off work" and "go home" can be established.

The above mapping relationship can be one-to-more, for example, another set of corpus may be as follows.

Q: I was busy for a day, and finally got off work.

A: Have a rest, is the work finished?

Similar to the above processing, a mapping relationship between "busy" and "rest" and a mapping relationship between "get off work" and "work" can be established.

Therefore, combining multiple corpus, the mapping relationship between "busy" and "tired", "rest" and the mapping relationship between "get off work" and "go home", "work" can be established.

After the above mapping relationships are obtained, they can be stored in a (key, value) form. For example, key may refer to "busy", and value may include "tired" and "rest".

Since the corpus may come from different corpus sources, different corpus sources may have different styles, thus the mapping relationships with different styles can be formed.

For example, a set of conversations in a TV series may include followings.

Q: I am thinking about the examination.
A: You must be considering cheating.
Q: Why do you always think the worst of me?
A: You should give me the chance to think your benefits.

Based on the above corpus, a set of mapping relationships with the humorous style, such as the mapping relationship between "thinking about" and "considering", and the mapping relationship between "examination" and "cheating", can be established.

For another example, a set of conversations in a romantic novel may include followings.

Q: I am thinking about the examination.
A: Honey, well your darling misses you, hum.

Based on the above corpus, a set of mapping relationships with the affectionate style, such as the mapping relationship between "I" and "honey", "your darling", the mapping relationship between "thinking about" and "miss", and the mapping relationship between "examination" and "you", can be established.

For another example, a set of conversations in a common social platform may include followings.

Q: I am thinking about the examination.
A: What are you considering about the examination?

Based on the above corpus, a set of mapping relationships with the common life style, such as the mapping relationship between "thinking about" and "considering", and the mapping relationship between "examination" and "what", can be established.

For another example, a set of conversations in the northeastern dialect may include followings.

Q: I am thinking about the examination.
A: What are you wondering, will you not do it during examination?

Based on the above corpus, a set of mapping relations with a northeastern style, such as the mapping relationship between "thinking about" and "wondering", and the mapping relationship between "examination" and "will not do", can be established.

At block S23, the keywords in the query and the keywords in the answer are extracted from the human conversation corpus, context information is extracted, and the prediction model is generated based on the obtained keywords and the context information.

Figure 4:
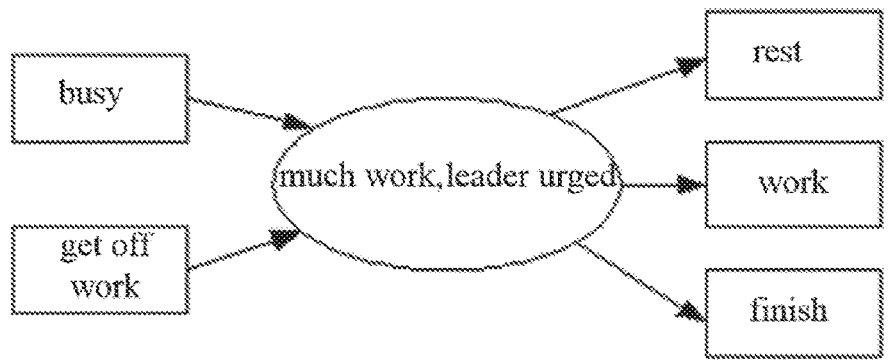
FIG. 4 is a schematic diagram of a prediction model according to an embodiment of the present disclosure.

For example, the keywords in a query include "busy" and "get off work", the context information in a corpus is "time is late", "want to go home", etc., the corresponding answer may often appear "tired" and "go home", the prediction model includes the correspondence relationship between the query, the context information and the answer as illustrated in FIG. 4. For another example, the keywords in a query include "busy" and "get off work", the context information in another corpus is "work late", "leader urged", etc., the corresponding answer may often appear "rest", "work", and "finish", the prediction model includes the correspondence relationship between the query, the context information and the answer as illustrated in FIG. 5.

Figure 5:
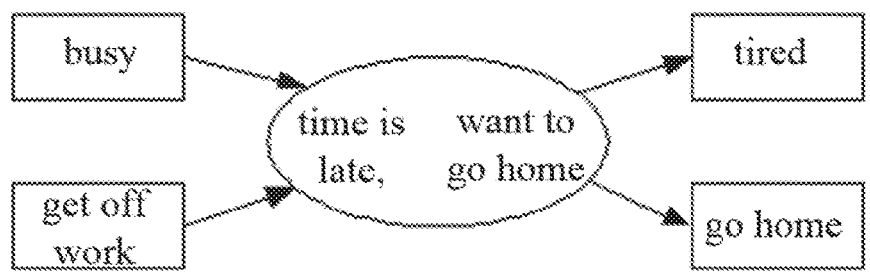
FIG. 5 is a schematic diagram of a prediction model according to another embodiment of the present disclosure.
Figure 6:
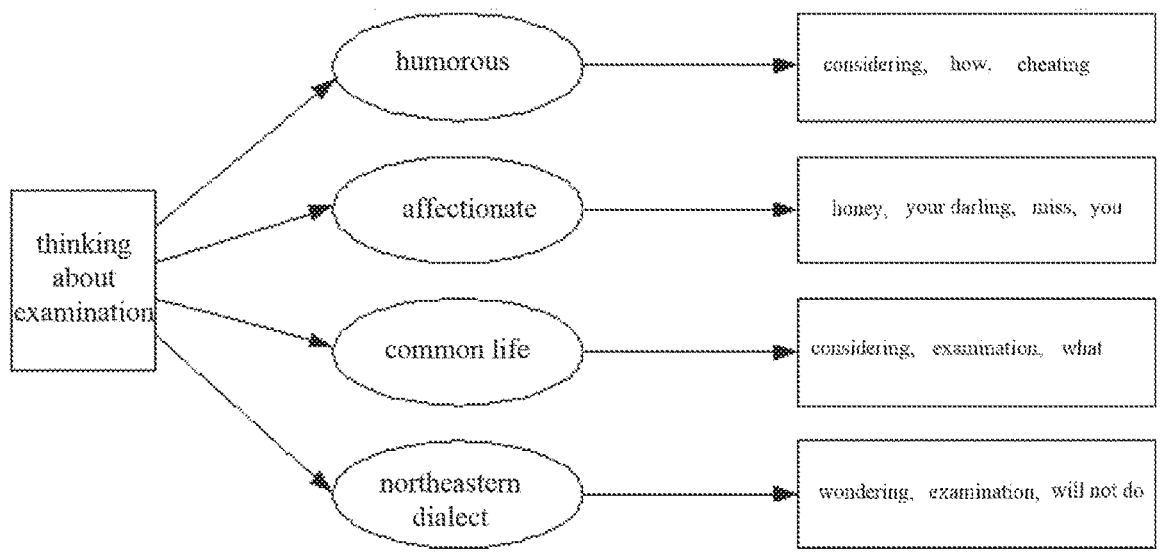
FIG. 6 is a schematic diagram of a prediction model according to another embodiment of the present disclosure.

FIGS. 4-5 illustrate it in the logical relationship, the above relationship in the prediction model is not limited to logic, and may also be stylistic. For example, corresponding to the same query "thinking about" and "examination", as illustrated in FIG. 6, different answers may be matched in different styles.

Furthermore, the prediction model may not only be configured to denote the correspondence relationship between the query, the context information and the answer, but also be configured to learn collocation, so as to supplement the answer according to the keywords in the answer and match the sentence. For example, the answer obtained according to the query and the context information includes keywords "be, considering, cheating", and then according to the humorous conversation corpus, the common allocation such as "be considering, how to cheat" in the corresponding style can be learned. In romantic novels, keywords such as "your darling, miss" may be extracted, and then the corresponding affectionate allocation such as "honey, miss you" can be learned, and finally such an affectionate allocation manner can be learned.

At block S24, a grammatical structure of the human conversation style is analyzed, to generate the grammar model.

The essence of the grammar model is a language model, the model can learn common grammatical structures in human speech according to the conversations in the corpus, and the main principle is to learn habitual expression manners in the human conversation according to part-of-speech tagging and sequence order of the pre-processed conversation pairs in the corpus, including addition and supplement of conjunctions and auxiliary words. For example, after "be considering, how to cheat" is learned in the above text, the grammar model may learn to construct a grammatical structure of an answer through the two phrases, thereby learning to add the conjunctions such as "that is". For another example, in the conversation in a romantic novel, after "honey, your darling, miss, you" generated corresponding to the above text is extracted from the reply, the grammar model will learn from these terms to the expression manner of "honey, well your darling misses you, hum" of the final reply, thereby learning the use of modal particles such as "well, hum", and learning such an affectionate expression manner. In the training phase, the grammar model mainly learns the structure order and the expression manner of the language in the corpus. The study of the structure order may ensure that the sentence is basically fluent, and the study of the expression manner may vary with the corpus style.

As described above, in the embodiment, the mapping relationship, the prediction model and the grammar model can be generated, and then the models can be used in the conversation phase.

In the embodiment, by collecting the human conversation corpus, the model can be generated based on the human conversation corpus, such that the machine can learn the human conversation style, after the model is applied to the conversation process, the machine can interact with humans in the human conversation style, making the human-machine interaction have the effect of real human-to-human conversation interaction.

Figure 7:
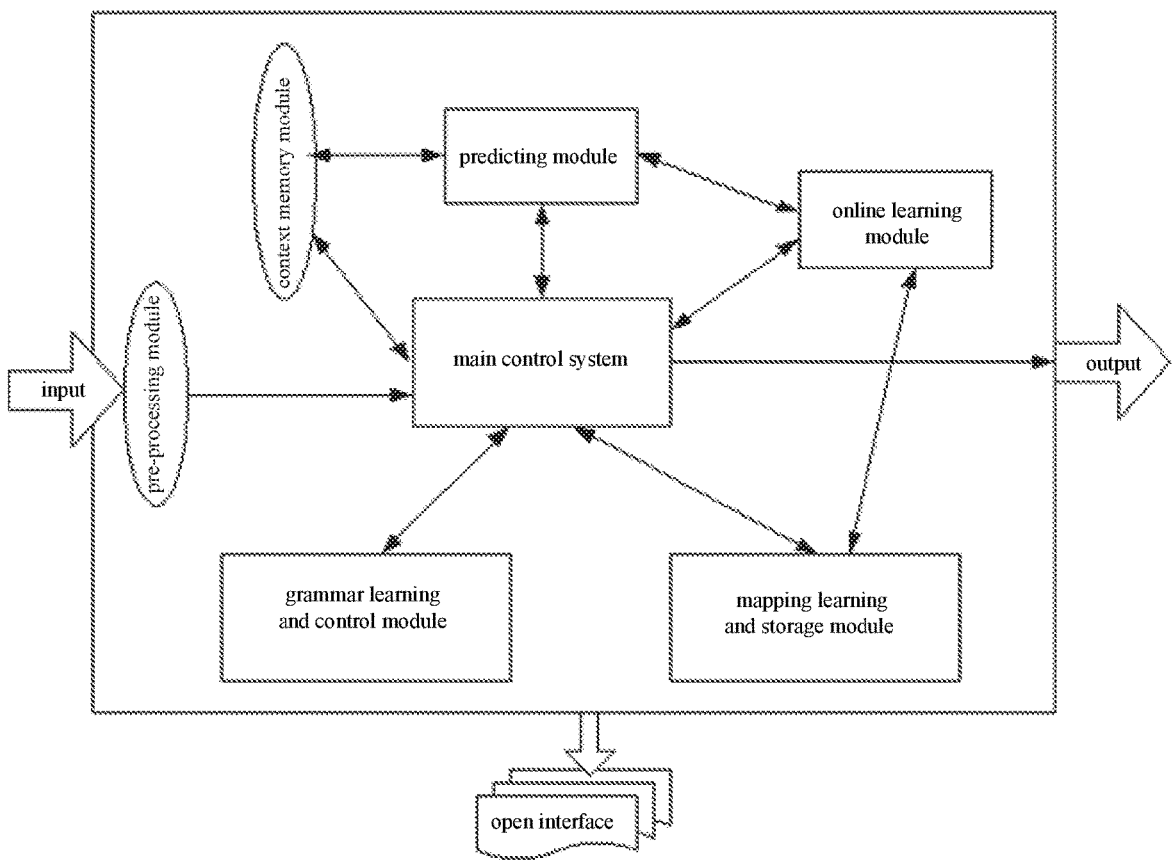
FIG. 7 is a schematic diagram of a general architecture corresponding to an embodiment of the present disclosure.

In combination with the above conversation process and the training process, as illustrated in FIG. 7, an overall architecture is given.

In the following, the entire flow including the training process and the conversation process will be described in conjunction with the architecture illustrated in FIG. 7.

Figure 8:
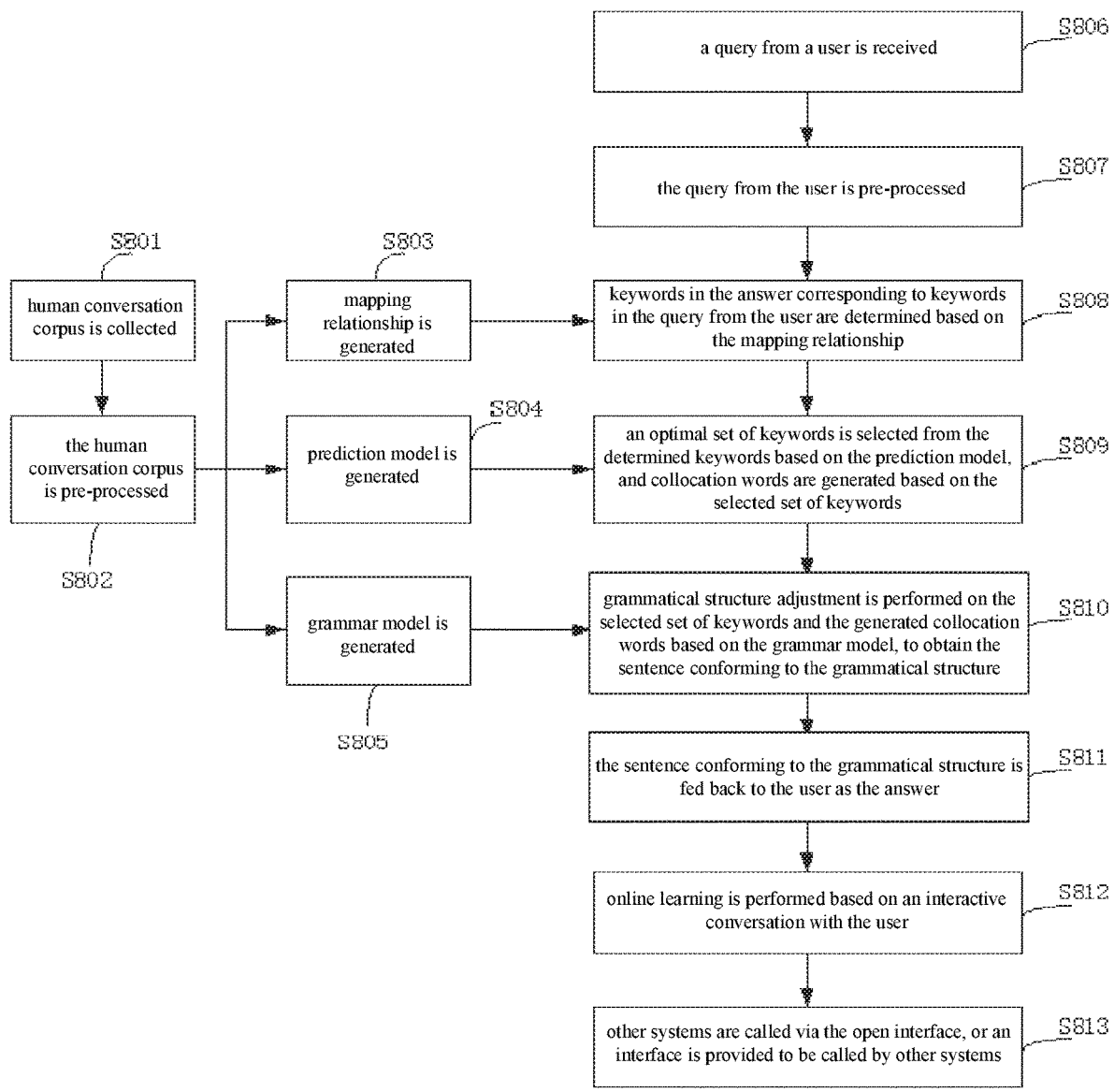
FIG. 8 is a flow chart of a human-machine interactive method based on artificial intelligence according to another embodiment of the present disclosure.

FIG. 8 is a flow chart of a human-machine interactive method based on artificial intelligence according to another embodiment of the present disclosure.

As illustrated in FIG. 8, the embodiment includes followings.

At block S801, human conversation corpus is collected.
At block S802, the human conversation corpus is preprocessed.

The pre-processing may include: performing word segmentation on the query and the answer in the human conversation corpus, respectively, selecting keywords and determining an identifier (id) corresponding to each keyword, so as to convert the word sequence into the id sequence.

A dictionary including the correspondence between words and identifiers may be obtained, and the word sequence can be converted into the corresponding id sequence according to the dictionary.

This step can be performed by a pre-processing module illustrated in FIG. 7.

At block S803, a mapping relationship between keywords in the query and keywords in the answer is generated according to the pre-processed human conversation corpus, and the mapping relationship is stored.

This step can be performed by a mapping learning and storage module illustrated in FIG. 7.

For detailed process of generating the mapping relationship, reference may be made to the above embodiments, and details are not described herein.

In addition, it can be understood that, since the above pre-processing is performed in the training phase, the above mapping relationship may be a mapping relationship between ids.

At block S804, a prediction model is generated based on the pre-processed human conversation corpus.

This step can be performed by a predicting module illustrated in FIG. 7.

For detailed process of generating the prediction model, reference may be made to the above embodiments, and details are not described herein.

At block S805, a grammar model is generated according to the pre-processed human conversation corpus.

This step can be performed by a grammar learning and control module illustrated in FIG. 7.

For detailed process of generating the grammar model, reference may be made to the above embodiments, and details are not described herein.

Blocks S801-S805 can be performed in the training phase.

In addition, the interaction between the various modules can be performed by a main control system illustrated in FIG. 7.

At block S806, a query from a user is received.

At block S807, the query from the user is pre-processed.

Pre-processing can be performed by the pre-processing module, and for detailed pre-processing process, reference may be made to the corresponding process in the above training phase.

At block S808, keywords in the answer corresponding to keywords in the query from the user are determined based on the mapping relationship.

The main control system can transmit the pre-processed query to the mapping learning and storage module, and the mapping learning and storage module determines the keywords in the answer corresponding to the pre-processed query according to the mapping relationship stored therein.

At block S809, an optimal set of keywords is selected from the determined keywords based on the prediction model, and collocation words are generated based on the selected set of keywords.

The main control system can obtain multiple sets of keywords from the mapping learning and storage module, and then the main control system can transmit the multiple sets of keywords to the predicting module, and current context information can be obtained by the context memory module, the prediction module can select a set of keywords from the multiple sets of keywords according to the generated prediction model and the current context information.

For example, multiple sets of keywords can be determined according to the mapping relationship. For example, when the keywords in the query include "busy" and "get off work", the keys determined based on the mapping relationship may include "rest, work, finish" and "tired, go home". In this step, an optimal set of keywords can be selected from the determined multiple sets of keywords based on the prediction model and the current context information. For example, when the current context information is "much work, leader urged", the selected set of keywords may be "rest, work, finish", or when the current context information is "time is late, want to go home", the selected set of keywords may be "tired, go home".

In addition, the prediction model can also determine the current style according to the context information, and then determine corresponding collocation words according to the style. For example, the selected set of keywords may be "be, considering", when the current style is humorous, the collocation words such as "be considering, how to cheat" can be determined, or when the current style is affectionate, the collocation words such as "honey, miss you" can be determined.

At block S810, grammatical structure adjustment is performed on the selected set of keywords and the generated collocation words based on the grammar model, to obtain the sentence conforming to the grammatical structure.

The main control system can obtain keywords and collocation words from the predicting module, and then transmit them to the grammar learning and control module, the order of the words are adjusted by the grammar learning and control module according to the grammar model, to generate the sentence conforming to the grammatical structure. The grammar model adopted by the grammar learning and control module may be generated based on the human conversation corpus in the training phase, or may be obtained from a third party via an open interface.

At block S811, the sentence conforming to the grammatical structure is fed back to the user as the answer.

For example, the main control system can be obtain the sentence conforming to the grammatical structure from the grammar learning and control module, and then perform speech synthesis on the sentence, and play it to the user via an output interface.

Furthermore, the method may further include followings.

At block S812, online learning is performed based on an interactive conversation with the user.

When talking with the user, the system can generate conversation corpus in real time, and the corpus includes current user's expression habits and styles. Therefore, the chat record with the user in a time period can be taken as the corpus to learn user's expression habits. The module mainly collects conversation records regularly as the corpus, to retrain the various modules of the system in real time. In the use of chat records, user's each input may also be a query relative to the previous answer of the machine, thus by taking the answer generated by the machine in the previous step as the query and the input of the user as the answer, this pair can be used to retrain, to make the system learn user's conversation style during the conversation process with the user. The module is a pluggable module. When the module is accessed, the module can continuously learn through the conversation between the user and the machine in a log. When the module is removed, the entire system can also operate normally.

Furthermore, the method may further include followings.

At block S813, other systems are called via the open interface, or an interface is provided to be called by other systems.

As illustrated in FIG. 7, the system may also provide some open interfaces. The open interfaces are open call interfaces and extended interfaces, the call interface can allow other systems to directly call the system via the interface, and the extended interface can access other related models or systems for function enhancement. For example, the grammar learning module can call other mature language models to enhance grammar learning and adjustment functions in the system.

In the embodiment, by collecting the human conversation corpus, the model can be generated based on the human conversation corpus, such that the machine can learn the human conversation style, after the model is applied to the conversation process, the machine can interact with humans in the human conversation style, making the human-machine interaction have the effect of real human-to-human conversation interaction. Furthermore, new data can be learned in real time through online learning, human-machine interaction effect can be improved. Furthermore, it can be called by other systems or call other systems via the open interface, human-machine interaction service can be better provided.

Figure 9:
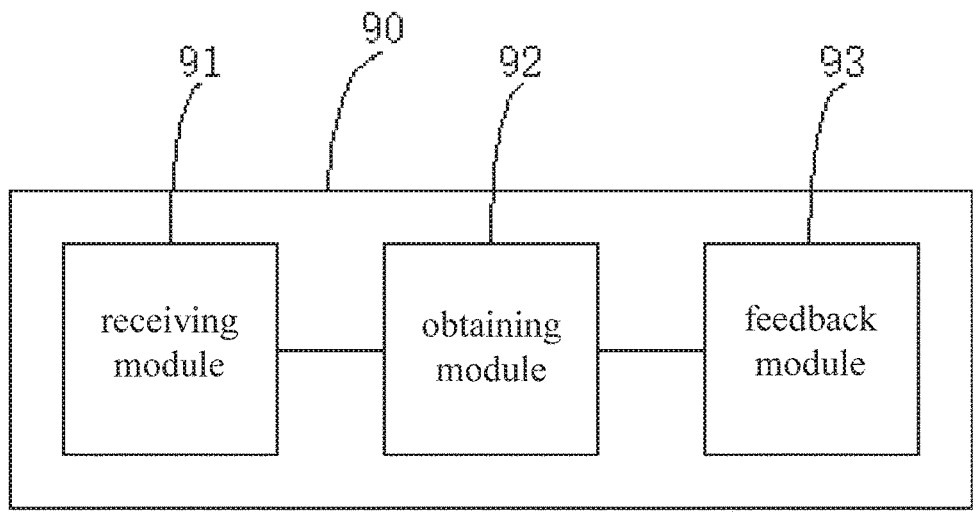
FIG. 9 is a block diagram of a human-machine interactive device based on artificial intelligence according to an embodiment of the present disclosure.

FIG. 9 is a block diagram of a human-machine interactive device based on artificial intelligence according to an embodiment of the present disclosure.

As illustrated in FIG. 9, the device 90 includes a receiving module 91, an obtaining module 92 and a feedback module 93.

The receiving module 91 is configured to receive a query from a user.

The obtaining module 92 is configured to process the query based on a pre-generated model, and obtain an answer with a human conversation style corresponding to the query. The model is generated based on a human conversation corpus.

The feedback module 93 is configured to feed back the answer to the user.

In some embodiments, the model includes a mapping relationship, a prediction model and a grammar model. The mapping relationship is configured to indicate a mapping relationship between keywords in the query and keywords in the answer. The prediction model is configured to determine an optimal mapping relationship from a plurality of mapping relationships based on context information, and generate collocation words matching the keywords in the determined mapping relationship. The grammar model is configured to adjust an order of terms, and generate a sentence conforming to a grammatical structure based on the adjusted terms.

Figure 10:
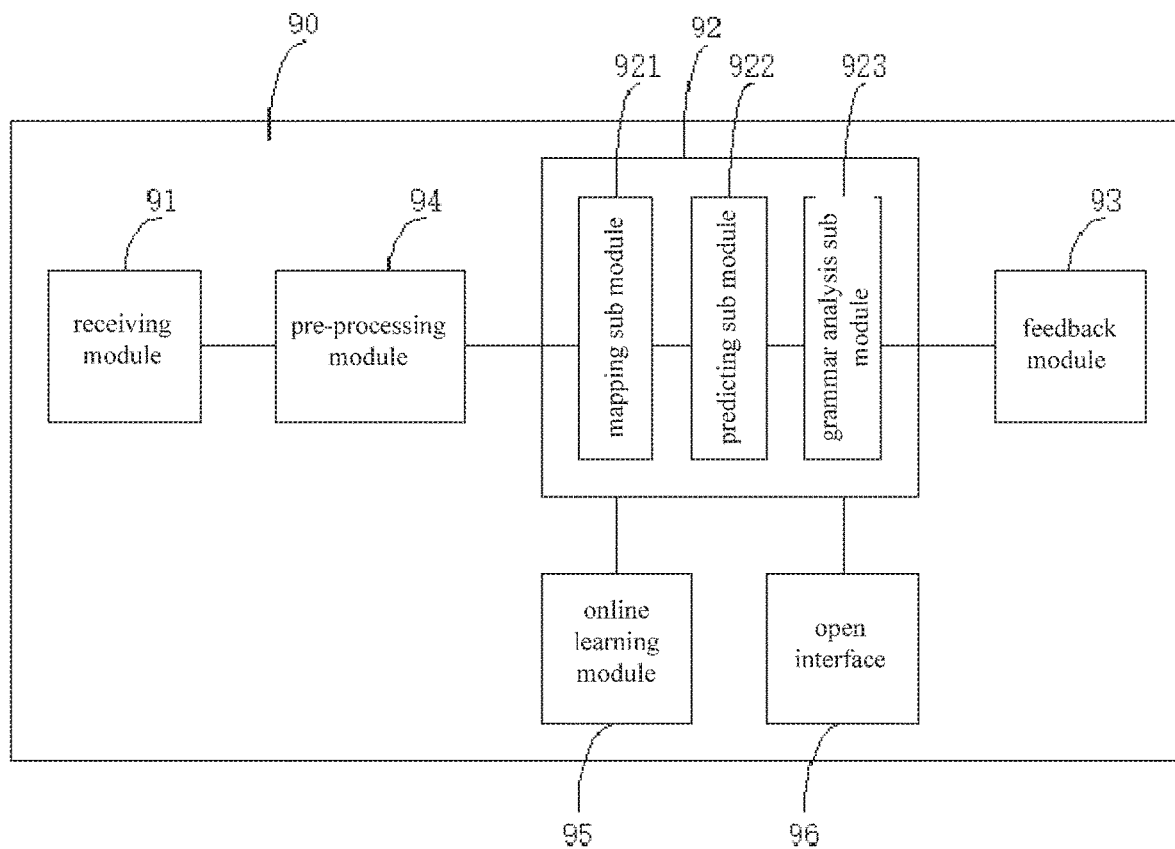
FIG. 10 is a block diagram of a human-machine interactive device based on artificial intelligence according to another embodiment of the present disclosure.

In some embodiments, as illustrated in FIG. 10, the obtaining module 92 includes a mapping sub module 921, a predicting sub module 922 and a grammar analysis sub module 923.

The mapping sub module 921 is configured to determine keywords in the answer corresponding to keywords in the query from the user based on the mapping relationship.

The predicting sub module 922 is configured to select an optimal set of keywords from the determined keywords based on the prediction model, and generate the collocation words based on the selected set of keywords.

The grammar analysis sub module 923 is configured to perform grammatical structure adjustment on the selected set of keywords and the generated collocation words based on the grammar model, to obtain the sentence conforming to the grammatical structure as the answer with the human conversation style.

In some embodiments, the mapping sub module is further configured to extract keywords in a query and keywords in an answer corresponding to the query in the human conversation corpus, and generate the mapping relationship based on the extracted keywords.

In some embodiments, the predicting sub module is further configured to extract keywords in the query and keywords in the answer corresponding to the query in the human conversation corpus, and extract corresponding context information, and generate the prediction model based on the extracted keywords and the context information.

In some embodiments, the grammar analysis sub module is further configured to generate the grammar model based on the human conversation corpus, or obtain the grammar model from other systems via an open interface.

In some embodiments, as illustrated in FIG. 10, the device 90 further includes a pre-processing module 94. The pre-processing module 94 is configured to pre-process the query, to trigger the obtaining module to process the pre-processed query based on the pre-generated model.

In some embodiments, as illustrated in FIG. 10, the device 90 further includes an online learning module 95. The online learning module 95 is configured to perform online learning based on an interactive conversation with the user.

In some embodiments, as illustrated in FIG. 10, the device 90 further includes an open interface 96. The open interface 96 is configured to call other systems or provide an interface to be called by other systems.

It can be understood that, the device in the embodiment corresponds to the foregoing method embodiments, and for details, reference may be made to related descriptions of the method embodiments, and details are not described herein.

In the embodiment, by collecting the human conversation corpus, the model can be generated based on the human conversation corpus, such that the machine can learn the human conversation style, after the model is applied to the conversation process, the machine can interact with humans in the human conversation style, making the human-machine interaction have the effect of real human-to-human conversation interaction. Furthermore, new data can be learned in real time through online learning, human-machine interaction effect can be improved. Furthermore, it can be called by other systems or call other systems via the open interface, human-machine interaction service can be better provided.

It can be understood that, the same or similar parts in the above embodiments may be referred to each other, and contents which are not described in detail in some embodiments may be referred to the same or similar contents in other embodiments.

Embodiments of the present disclosure provide a device. The device includes a processor and a memory configured to store instructions executable by the processor. The processor is configured to: receive a query from a user; process the query based on a pre-generated model, and obtain an answer with a human conversation style corresponding to the query, in which the model is generated based on a human conversation corpus; and feed back the answer to the user.

Embodiments of the present disclosure provide a non-transitory computer-readable storage medium. When instructions stored in the storage medium are executed by a processor, the processor can perform acts of: receiving a query from a user; processing the query based on a pre-generated model, and obtaining an answer with a human conversation style corresponding to the query, in which the model is generated based on a human conversation corpus; and feeding back the answer to the user.

Embodiments of the present disclosure provide a computer program product. When instructions stored in the computer program product are executed by a processor, the processor can perform acts of: receiving a query from a user; processing the query based on a pre-generated model, and obtaining an answer with a human conversation style corresponding to the query, in which the model is generated based on a human conversation corpus; and feeding back the answer to the user.

It should be noted that, in the description of the present disclosure, terms such as "first" and "second" are used herein for purposes of description and are not intended to indicate or imply relative importance or significance. Furthermore, in the description of the present disclosure, "a plurality of" refers to two or more unless otherwise specified.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the functions may be executed in other orders instead of the order illustrated or discussed, including in a basically simultaneous manner or in a reverse order, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A human-machine interactive method based on artificial intelligence, executed by an electronic device including at least one processor, the method comprising:
   receiving a query from a user;
   processing the query based on a pre-generated model, wherein, the pre-generated model comprises a mapping relation, a prediction model and a grammar model; the mapping relation is generated based on keywords of a preset query and keywords of a preset answer corresponding to the preset query contained in a human conversation corpus: wherein the keywords of the preset query are extracted from terms of the preset query and the keywords of the preset answer are extracted from terms of the preset answer: the terms of the preset query are obtained by performing word segmentation on the preset query and the terms of the preset answer are obtained by performing word segmentation on the preset answer: wherein each keyword of the preset query corresponds to two or more keywords of preset answers, and the two or more keywords of the preset answers are related to different sentiments indicated by context information respectively; and the grammar model is generated according to part-of-speech tagging and sequence order of pre-processed conversation pairs in human conversation corpuses;
   obtaining an answer with a human conversation style corresponding to the query;
   feeding back the answer to the user;
   wherein obtaining the answer comprises: determining keywords in the answer corresponding to keywords in the query received from the user based on the mapping relationship: selecting a set of keywords from the determined keywords through the prediction model based on sentiment indicated by context information of the query: generating collocation words based on the set of keywords; and adjusting an order of the set of keywords and the collocation words through the grammar model, to obtain the sentence conforming to the grammatical structure as the answer with the human conversation style.

2. The method according to claim 1, wherein processing the query based on the pre-generated model, and obtaining the answer with the human conversation style corresponding to the query comprises:
   determining keywords in the answer corresponding to keywords in the query from the user based on the mapping relationship;

selecting an optimal set of keywords from the determined keywords based on the prediction model, and generating the collocation words based on the selected set of keywords; and performing grammatical structure adjustment on the selected set of keywords and the generated collocation words based on the grammar model, to obtain the sentence conforming to the grammatical structure as the answer with the human conversation style.

3. The method according to claim 1, further comprising: extracting keywords in a query and keywords in an answer corresponding to the query in the human conversation corpus, and generating the mapping relationship based on the extracted keywords.

4. The method according to claim 1, further comprising: extracting keywords in the query and keywords in the answer corresponding to the query in the human conversation corpus, and extracting corresponding context information, and generating the prediction model based on the extracted keywords and the context information.

5. The method according to claim 1, further comprising: generating the grammar model based on the human conversation corpus, or obtaining the grammar model from other systems via an open interface.

6. The method according to claim 1, further comprising: pre-processing the query, and processing the pre-processed query based on the pre-generated model.

7. The method according to claim 1, further comprising: performing online learning based on an interactive conversation with the user.

8. The method according to claim 1, further comprising: calling other systems via the open interface, or being called by other systems via the open interface.

9. A human-machine interactive device based on artificial intelligence, comprising:
a processor;
a memory, configured to store instructions executable by the processor;
wherein the processor is configured to:
receive a query from a user;
process the query based on a pre-generated model, wherein, the pre-generated model comprises a mapping relation, a prediction model and a grammar model; the mapping relation is generated based on keywords of a preset query and keywords of a preset answer corresponding to the preset query contained in a human conversation corpus: wherein the keywords of the preset query is extracted from terms of the preset query and the keywords of the preset answer is extracted from terms of the preset answer: the terms of the preset query are obtained by performing word segmentation on the preset query and the terms of the preset answer are obtained by performing word segmentation on the preset answer: wherein each keyword of the preset query corresponds to two or more keywords of the preset answers, and the two or more keywords of the preset answers are related to different sentiments indicated by context information respectively; and the grammar model is generated according to part-of-speech tagging and sequence order of pre-processed conversation pairs in human conversation corpuses;
obtain an answer with a human conversation style corresponding to the query; and
feed back the answer to the user;
wherein obtaining the answer comprises: determining keywords in the answer corresponding to keywords in the query received from the user based on the mapping relationship: selecting a set of keywords from the determined keywords through the prediction model based on sentiment indicated by context information of the query: generating collocation words based on the set of keywords; and adjusting an order of the set of keywords and the collocation words through the grammar model, to obtain the sentence conforming to the grammatical structure as the answer with the human conversation style.

10. The device according to claim 9, wherein the processor is further configured to:
determine keywords in the answer corresponding to keywords in the query from the user based on the mapping relationship;
select an optimal set of keywords from the determined keywords based on the prediction model, and generate the collocation words based on the selected set of keywords; and
perform grammatical structure adjustment on the selected set of keywords and the generated collocation words based on the grammar model, to obtain the sentence conforming to the grammatical structure as the answer with the human conversation style.

11. The device according to claim 10, wherein the processor is configured to:
extract keywords in a query and keywords in an answer corresponding to the query in the human conversation corpus, and generate the mapping relationship based on the extracted keywords;
extract the keywords in the query and the keywords in the answer corresponding to the query in the human conversation corpus, and extract corresponding context information, and generate the prediction model based on the extracted keywords and the context information; or
generate the grammar model based on the human conversation corpus, or obtain the grammar model from other systems via an open interface.

12. The device according to claim 9, wherein the processor is further configured to:
pre-process the query, and process the pre-processed query based on the pre-generated model.

13. The device according to claim 9, wherein the processor is further configured to:
perform online learning based on an interactive conversation with the user.

14. The device according to claim 9, wherein the processor is further configured to:
call other systems or provide an interface to be called by other systems.

15. A non-transitory computer-readable storage medium, wherein when instructions stored in the storage medium are executed by a processor, the processor is configured to perform a human-machine interactive method based on artificial intelligence the method comprising:
receiving a query from a user;
processing the query based on a pre-generated model, wherein, the pre-generated model comprises a mapping relation, a prediction model and a grammar model; the mapping relation is generated based on keywords of a preset query and keywords of a preset answer corresponding to the preset query contained in a human conversation corpus: wherein the keywords of the preset query is extracted from terms of the preset query and the keywords of the preset answer is extracted from terms of the preset answer: the terms of the preset query are obtained by performing word segmentation on the preset query and the terms of the preset answer are obtained by performing word segmentation on the preset answer: wherein each keyword of the preset query corresponds to two or more keywords of the preset answers, and the two or more keywords of the preset answers are related to different sentiments indicated by context information respectively; and the grammar model is generated according to part-of-speech tagging and sequence order of pre-processed conversation pairs in human conversation corpuses;

obtaining an answer with a human conversation style corresponding to the query; and feeding back the answer to the user;

wherein obtaining the answer comprises: determining keywords in the answer corresponding to keywords in the query received from the user based on the mapping relationship; selecting a set of keywords from the determined keywords through the prediction model based on sentiment indicated by context information of the query; generating collocation words based on the set of keywords; and adjusting an order of the set of keywords and the collocation words through the grammar model, to obtain the sentence conforming to the grammatical structure as the answer with the human conversation style.

* * * * *